(12) United States Patent
Chou

(10) Patent No.: US 6,862,177 B2
(45) Date of Patent: Mar. 1, 2005

(54) VIBRATION-REDUCING SYSTEM FOR DATA ACCESS APPARATUS

(75) Inventor: Chen-Wang Chou, Taipei (TW)

(73) Assignee: Uniwill Computer Corporation, Chung Li (TW)

( * ) Notice: Subject to any disclaimer, the term of this patent is extended or adjusted under 35 U.S.C. 154(b) by 45 days.

(21) Appl. No.: 10/616,967

(22) Filed: Jul. 11, 2003

(65) Prior Publication Data

US 2004/0032066 A1 Feb. 19, 2004

(30) Foreign Application Priority Data

Aug. 13, 2002 (TW) .................................... 91118155 A

(51) Int. Cl.$^7$ ................................................. G06F 1/16
(52) U.S. Cl. .................... 361/685; 369/248; 360/97.02; 248/634
(58) Field of Search ................ 361/684–687, 361/724–727; 369/247–248, 263, 75.1; 360/97.02; 248/635–638, 634, 618

(56) References Cited

U.S. PATENT DOCUMENTS 5,956,314 A   9/1999  Ishimatsu et al. .......... 369/247
6,249,432 B1 * 6/2001  Gamble et al. ............. 361/685
6,525,933 B2 * 2/2003  Eland ......................... 361/686
6,625,016 B2 * 9/2003  Glusing et al. ............. 361/686
2002/0097556 A1   7/2002  Lee ........................... 361/685

FOREIGN PATENT DOCUMENTS

JP           2-283934         11/1990

OTHER PUBLICATIONS

English Language Abstract of JP 2–283934.

* cited by examiner

Primary Examiner—Hung Van Duong
(74) Attorney, Agent, or Firm—Michael D. Bednarek; Shaw Pittman LLP

(57) ABSTRACT

A vibration-reducing system for use with a data processing apparatus is provided. The data processing apparatus includes a data access apparatus. The vibration-reducing system includes at least one first elastic element and at least one second elastic element, and the elastic modulus of the second elastic element is smaller than the elastic modulus of the first elastic element. The first elastic element connects the data access apparatus to the data processing apparatus, and the second elastic element is disposed between the data processing apparatus and the data access apparatus. A part of impact energy is removed from the data access apparatus by using the difference between the elastic modulus of the first and the second elastic elements.

19 Claims, 7 Drawing Sheets

VIBRATION-REDUCING SYSTEM FOR DATA ACCESS APPARATUS

This application claims priority of Taiwan Patent Application No.091118155 filed on Aug. 13, 2002.

FIELD OF INVENTION

The present invention relates to a vibration-reducing system for reducing vibration of a data access apparatus, which is generated by an impact.

BACKGROUND OF THE INVENTION

On the ground of the increased request of precision, data access apparatus are getting more brittle today. Therefore, reducing the effect of external impacts is brought into an important issue regarding the durability of data access apparatuses, such as hard disks having high operation speed.

Comparing with other hard disks, the vibration-control requirements of the hard disks disposed on portable computers are relative high. The requirements are on the ground that those hard disks have to meet frequently movements, and the movement is a main reason to damage the hard disks. In addition, even though other desktop computers are not frequently moved, however, the vibration control of the hard disks of these desktops are also important due to the increase of operation speed.

Accordingly, the vibration-control problems of hard disks still exist and need to be solved, no matter the hard disks are disposed on portable computers or desktop computers.

SUMMARY OF THE INVENTION

It is an aspect of the present invention to reduce vibration of a data apparatus generated by an impact.

It is another aspect of the present invention to remove a part of energy of the data apparatus generated by an impact.

It is another aspect of the present invention to reduce a high-frequency vibration, which is generated during the operation of the data access apparatus, transmitted to a data processing apparatus.

The present invention provides a vibration-reducing system for use with a data processing apparatus, which has a data access apparatus. The data processing apparatus includes a body, which has a depression. The vibration-reducing system includes at least one first elastic element and at least one second elastic element. The first elastic element connects the data access apparatus to the body allowing the data access apparatus being suspended within the depression. The second elastic element includes a first surface and a second surface. The first surface connects to the body, and the second surface contacts with the data access apparatus.

The first elastic element has flexibility in bending, vertical extension and compression. The second elastic element has one-dimensional flexibility. The second elastic element has an elastic modulus, which is smaller than the elastic modulus of the first elastic element. While the body is impacted to generate an initial energy and a displacement, the data access apparatus stretches or bends the first elastic element and compresses the second elastic element. Then a damping effect is generated on the ground of a difference between the elastic modulus of the first and the second elastic elements. The damping effect helps to remove a part of the initial energy from the data access apparatus.

This and other aspects of the present invention will become clear to those of ordinary skills in the art after having read the following detailed description of the preferred embodiments illustrated in the various figures and drawings.

DETAILED DESCRIPTION

Figure 1:
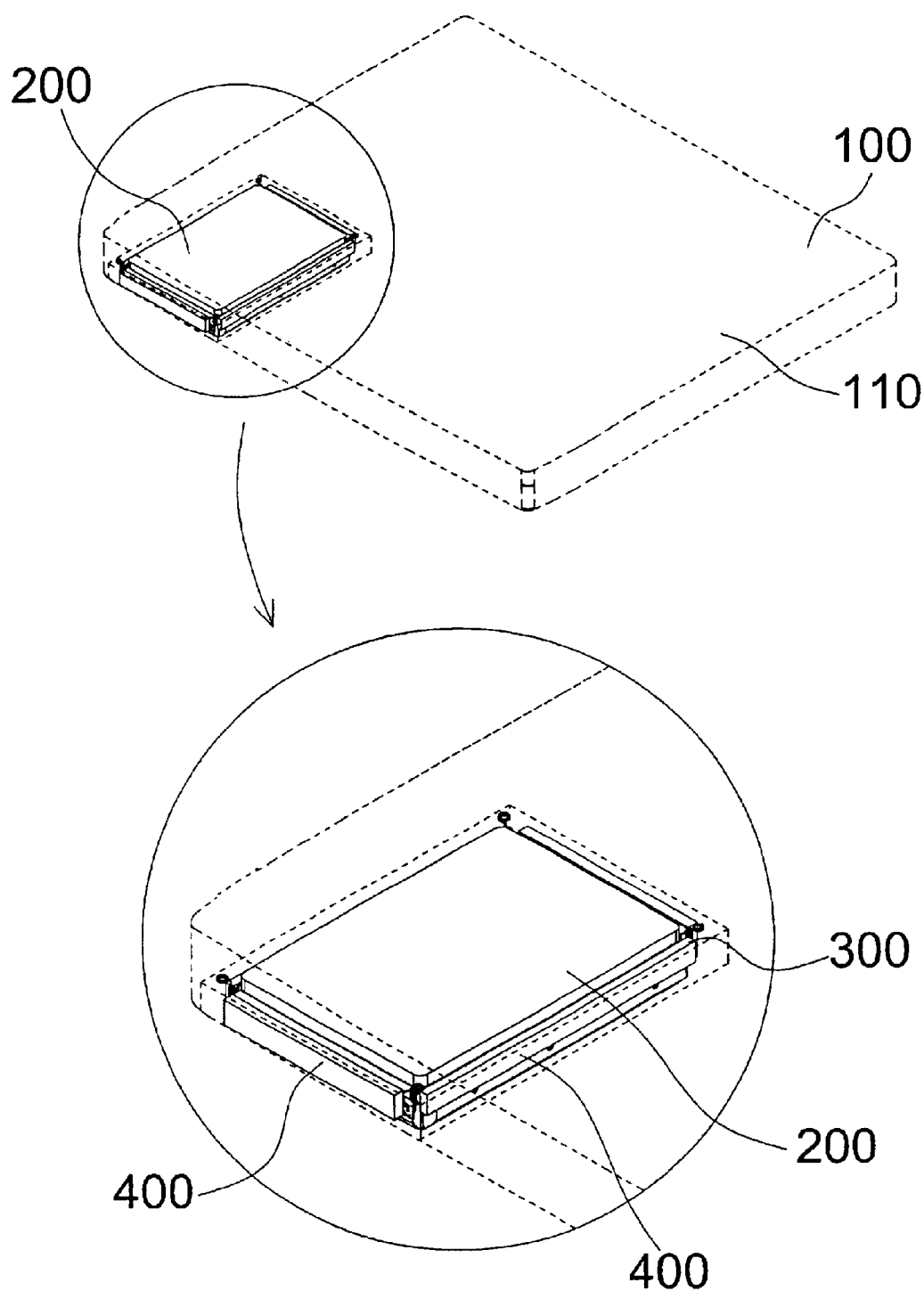
FIG. 1 shows an embodiment of the present invention.

The present invention provides a vibration-reducing stem for use with a data processing apparatus 100, which has a data access apparatus 200. As FIG. 1 shows, the data processing apparatus 100 includes a body 110, which has a depression 111 for containing the data access apparatus 200. When the body 110 is impacted, such as being struck, the vibration-reducing system is configured for reducing the generated vibration.

In preferred embodiment, the data access apparatus 200 includes a hard disk. However, the data access apparatus 200 may includes other device such as a floppy drive, disk displayer, memory or others. In addition, the data processing apparatus 100 includes a portable computer. However, the data processing apparatus 100 may includes personal computer (PC), personal digital assistant (PDA), mobile phone or others which may cooperate with the data access apparatus 200.

Figure 2:
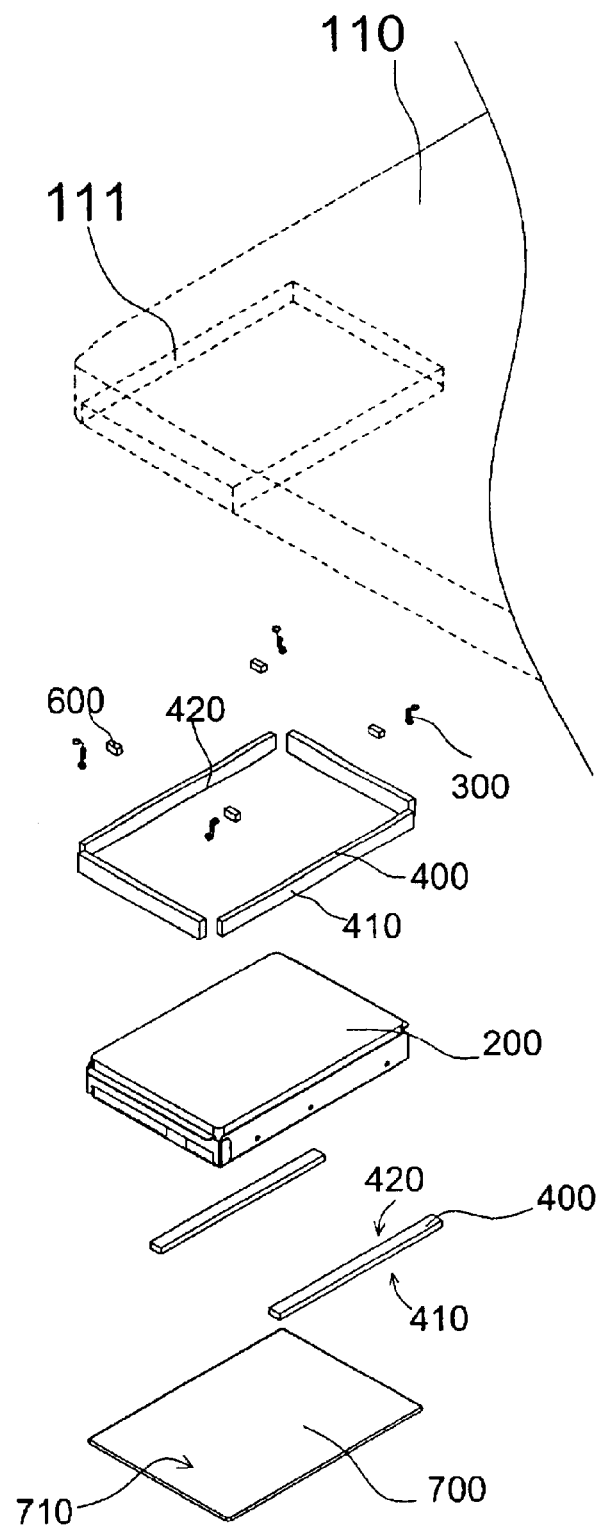
FIG. 2 shows an explosive view of the embodiment of FIG. 1.

FIG. 2 shows an explosive view of an embodiment of the present invention. The vibration-reducing system includes at least one first elastic element 300 and at least one second elastic element 400. A first end of the first elastic element 300 connects with the data access apparatus 200, and a second end of the first elastic element 300 connects with the body 100. In this embodiment, the second end of the first elastic element 300 connects with a top surface of the depression 111. The data access apparatus 200 is suspended within the depression 111 by using the first elastic element 300. The preferred embodiment of the first elastic element 300 includes a spring, and other embodiments of it include an elastic rubber, a sponge and others.

In a preferred embodiment, a vibration absorbing spacer 600 is disposed between the first elastic element 300 and the data access apparatus 200. While the data access apparatus is operating, a high-frequency vibration is generated and transmitted to the body 110. The spacer 600 is used to absorb the vibration so that the strength of the vibration, which is transmitted to the data access apparatus 200, is reduced. The preferred embodiment of the spacer 600 is made of rubber. But in other embodiments, the spacer 600 may be made of sponge or polymer materials.

The first elastic element 300 has flexibility in bending, vertical extension and compression. Therefore, the data access apparatus 200 is capable of moving relative to the body 110 in a 3-dimensional space by bending, stretching or compressing the first elastic element 300. However, the movement of the data access apparatus 200 is limited to the space of the depression 111. When the body 110 is impacted, the data access apparatus 200 may move corresponding to the impaction force. It should be noted that, in the preferred embodiment, the first elastic element 300 merely has flexibility in bending and vertical extension.

In the preferred embodiment, the data access apparatus 200 is a cube, and four first elastic elements 300 are respectively disposed to connect with the four corners of the cube. However, in other embodiments, the amount and the disposed position may be adjusted according to different conditions, such as a different shape of the data access apparatus 200.

As FIG. 2 shows, the second elastic element 400 is disposed between the body 110 and the data access apparatus 200. The second elastic element 400 includes a first surface 410 and a second surface 420 opposite to the first surface 410. The first surface 410 connects with the body 110 and the second surface 420 contacts with the data access apparatus 200. In the preferred embodiment, the second elastic element 400 includes a vibration-absorptive material, such as PU polymer, rubber, sponge or other alike.

The second elastic element 400 has one-dimensional flexibility. In the preferred embodiment, the direction of the flexibility is vertical or perpendicular to the first surface 410 or the second surface 420. However, the second elastic element 400 may also be bended or compressed in other directions.

Moreover, the second elastic element 400 has an elastic modulus, which is smaller than the elastic modulus of the first elastic element 300. In other words, the first elastic element 300 provides a reaction force and a rebound speed, which exceed those provided by the second elastic element 400, while the first elastic element 300 and the second elastic element 400 are compressed or stretched with the same displacement. It should be noted that the elastic modulus mentioned here includes that of stretch, compression and bending.

In the preferred embodiment, the data access apparatus 200 is a cube, and six second elastic elements 400 are respectively disposed to connect with the six surfaces of the cube. However, in other embodiments, the amount and the disposed position may be adjusted according to different conditions, such as a different shape of the data access apparatus 200.

While the body 110 is impacted, an initial energy and corresponding displacement of the data access apparatus 200 are generated. The displacement forces the data access apparatus 200 to stretch or bend the first elastic element 300 and compress the second elastic element 400. Then a damping effect is generated due to a difference between the elastic modulus of the first and the second elastic elements 300, 400. The damping effect mentioned here may be interpreted as an effect for exhausting the system energy. The damping effect helps the vibration-reducing system to remove a part of the initial energy from the data access apparatus 200.

Figure 3A:
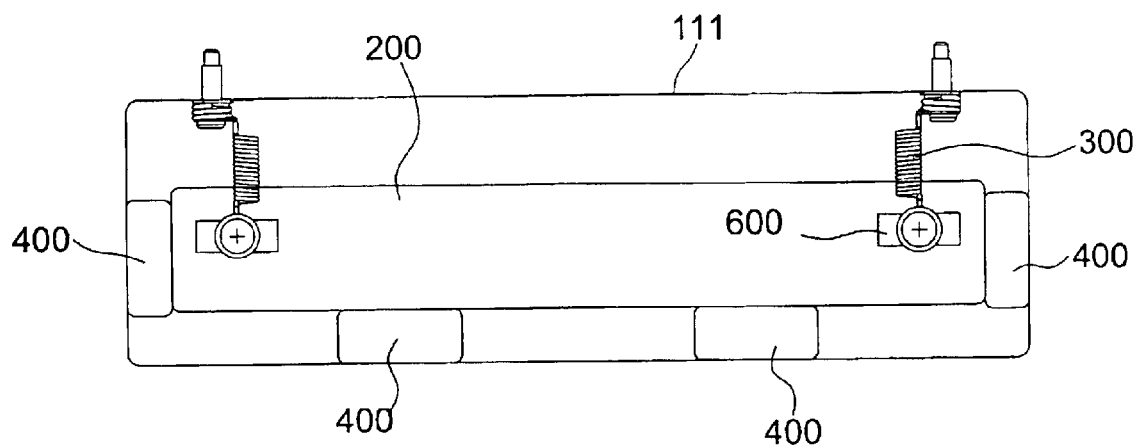
FIG. 3a shows a profile of the embodiment of FIG. 1.
Figure 3B:
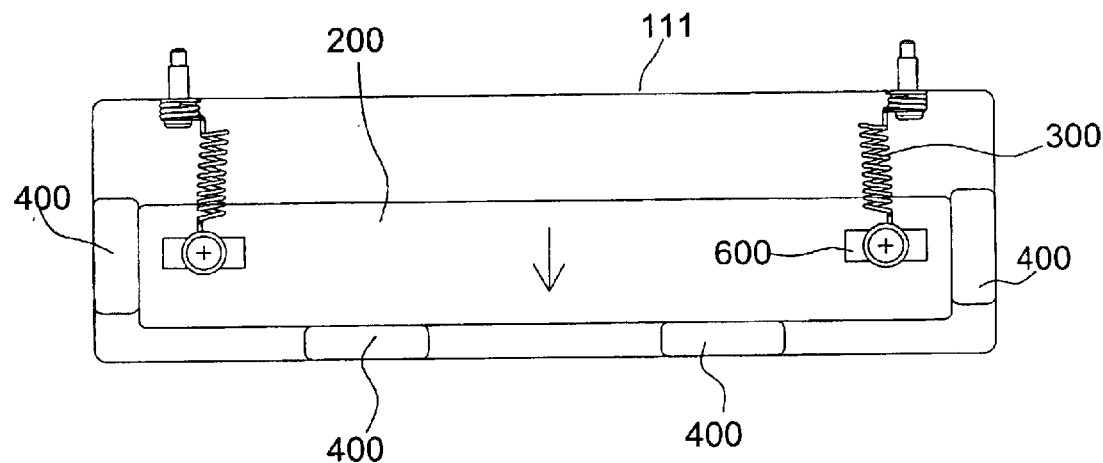
FIG. 3b shows a profile of the embodiment of FIG. 1 when the first elastic element is stretched.
Figure 3C:
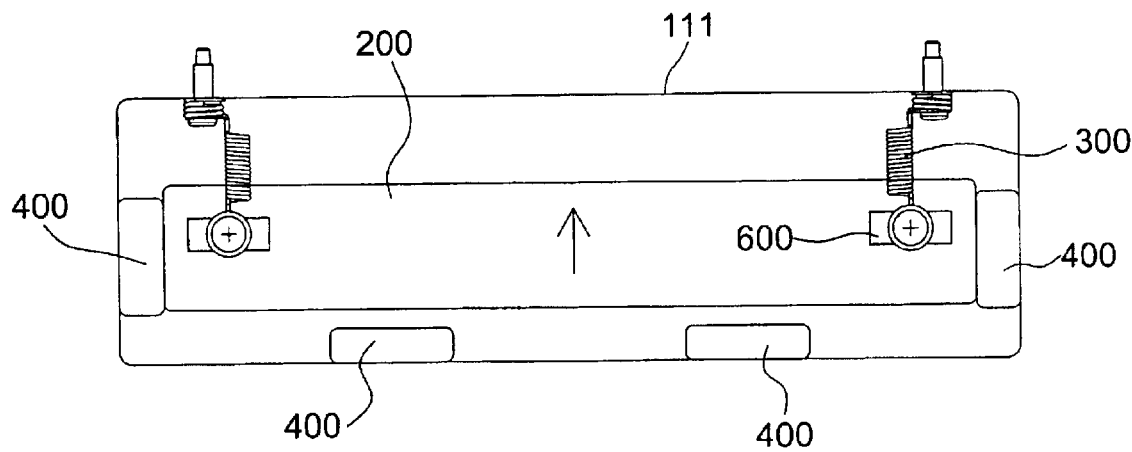
FIG. 3c shows a profile of the embodiment of FIG. 1 when the first elastic element rebounds.

FIG. 3a, FIG. 3b and FIG. 3c are used to illustrate the damping effect. FIG. 3a shows a profile of the vibration-reducing system while the body has not been impacted. In the meantime, the first elastic element 300 is in the natural state and merely bearing the weight of the of the data access apparatus 300.

As FIG. 3b shows, while the body 110 is impacted to generate the initial energy, the displacement of the data access apparatus 200 is generated to stretch the first elastic element 300 and to compress the second elastic element 400. In the meantime, apart of the initial energy is transmitted to the first elastic element 300 as a first potential energy, and another part of the initial energy is transmitted to the second elastic element as a second potential energy. In this embodiment, under a unique-displacement condition, the first potential energy is larger than the second potential energy, because the elastic module of the first elastic element 300 is larger than that of the second elastic element 400.

Then, as FIG. 3c shows, the first potential energy provides the data access apparatus 200 with a rebound energy and a rebound speed. In other words, a part of the first potential energy is transmitted back to the data access apparatus 200 as a kinetic energy, which provides the rebound speed. The rebound speed exceeds a returning speed of the second elastic element 400 to separate the second surface 420 of the second elastic element 400 from the data access apparatus 200. This prevents the second potential energy from transmitting back to the data access apparatus 200. Accordingly, a part of the initial energy is removed from the data access apparatus 200.

Figure 4A:
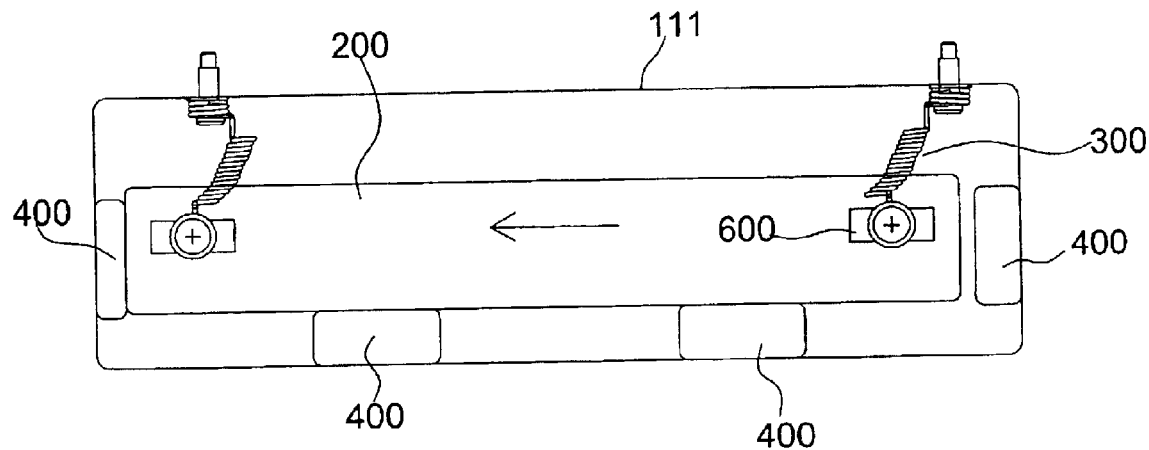
FIG. 4a shows a profile of the embodiment of FIG. 1 when the first elastic element is bended.
Figure 4B:
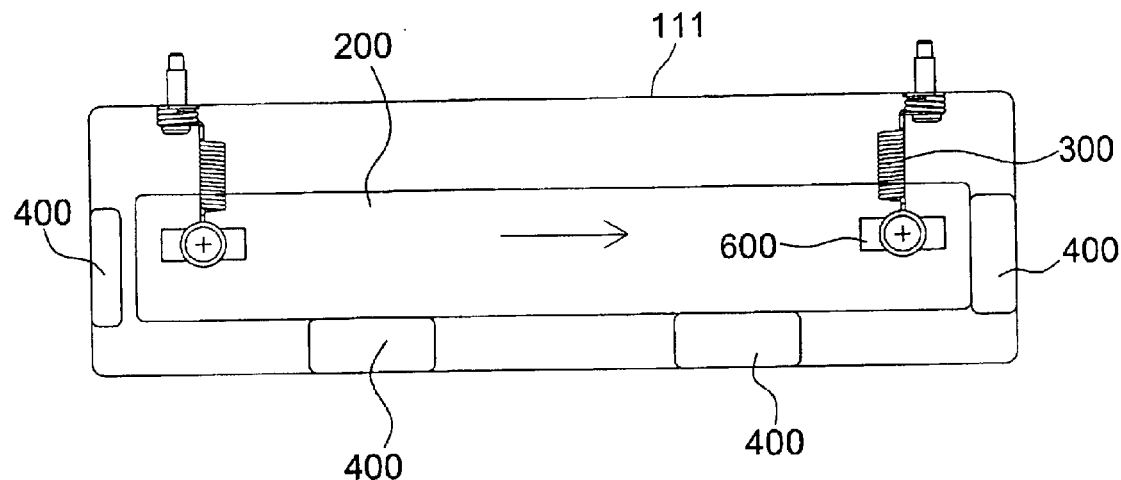
FIG. 4b shows a profile of the embodiment of FIG. 1 when the first elastic element rebounds.

FIG. 4a and FIG. 4b show another embodiment of the damping effect. As FIG. 4a shows, while the body 110 is impacted to generate the initial energy, the displacement of the data access apparatus 200 is generated to bend the first elastic element 300 and to compress the second elastic element 400. In the meantime, a part of the initial energy is transmitted to the first elastic element 300 as a first potential energy, and another part of the initial energy is transmitted to the second elastic element as a second potential energy. In this embodiment, under a unique-displacement condition, the first potential energy is larger than the second potential energy, because the elastic module of the first elastic element 300 is larger than that of the second elastic element 400.

Then, as FIG. 4b shows, the first potential energy provides the data access apparatus 200 with a rebound energy and a rebound speed. In other words, a part of the first potential energy is transmitted back to the data access apparatus 200 as a kinetic energy, which provides the rebound speed. The rebound speed exceeds a returning speed of the second elastic element 400 to separate the second surface 420 of the second elastic element 400 from the data access apparatus 200. This prevents the second potential energy from transmitting back to the data access apparatus 200. Accordingly, apart of the initial energy is removed from the data access apparatus 200.

Figure 5:
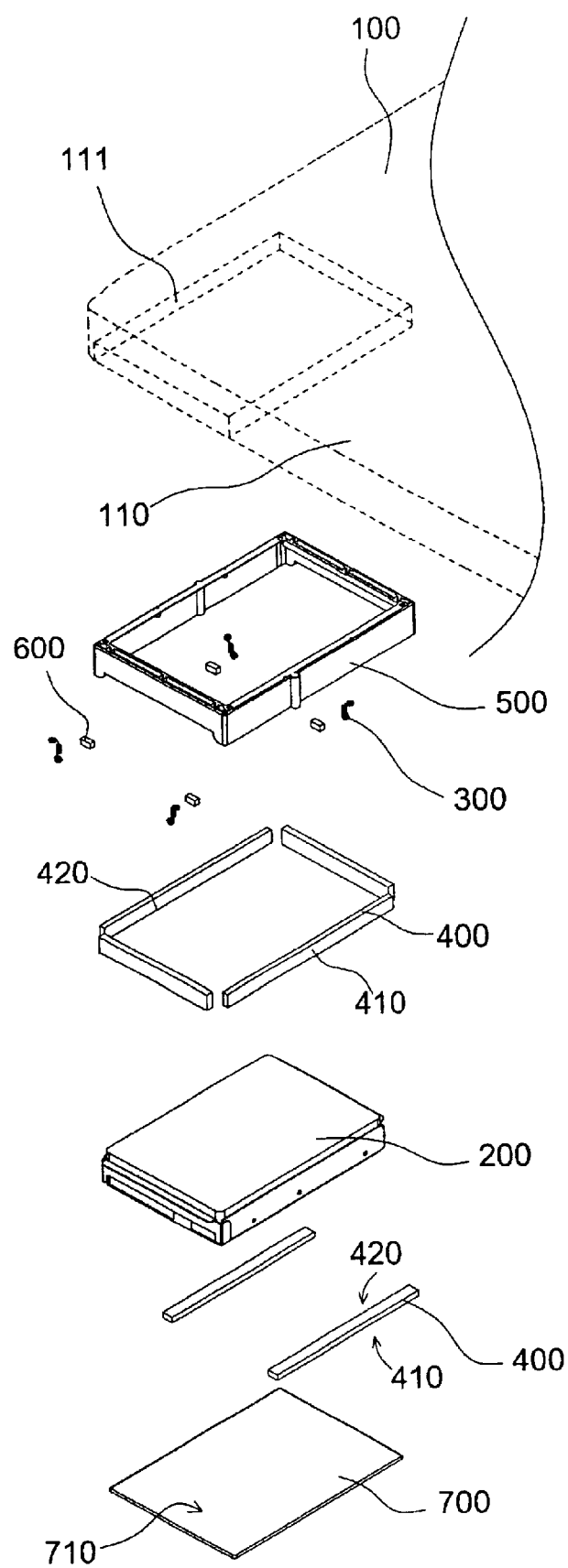
FIG. 5 shows another embodiment of the present invention.

FIG. 5 shows an explosive view of another embodiment of the present invention. As FIG. 5 shows, the body 110 further includes a frame 500, which is contained within the depression 111 and separably coupled to an inner surface of the depression 111. The first elastic element 300 connects to both the frame 500 and the data access apparatus 200 so that the data access apparatus 200 is suspended from the frame 500. The second elastic element 400 is disposed between the frame 500 and the data access apparatus 200, and the first surface 410 of the second elastic element 400 connects to the frame 500. When a user intends to draw out the data access apparatus 200 from the body 110, all he or she has to do is separating the frame 500 from the inner surface of the depression 111.

As FIG. 5 shows, the body 110 further includes a cover 700 corresponding to the depression 111 for covering the data access apparatus 200. At least one second elastic element 400 is disposed between the cover 700 and the data access apparatus 200. The first surface 410 of the second elastic element 400 connects to an inner surface 710 of the cover 700, and the second surface 420 of the second elastic element 400 contacts with the data access apparatus 200. When a user intends to draw out the data access apparatus 200 from the body 110, he or she merely need to open the cover 700 rather than to disassemble the body 110.

The present invention also provides a method for applying on the vibration-reducing system mentioned above. This method is used for removing a part of the initial energy to reduce the vibration of the data access apparatus 200.

Figure 6:
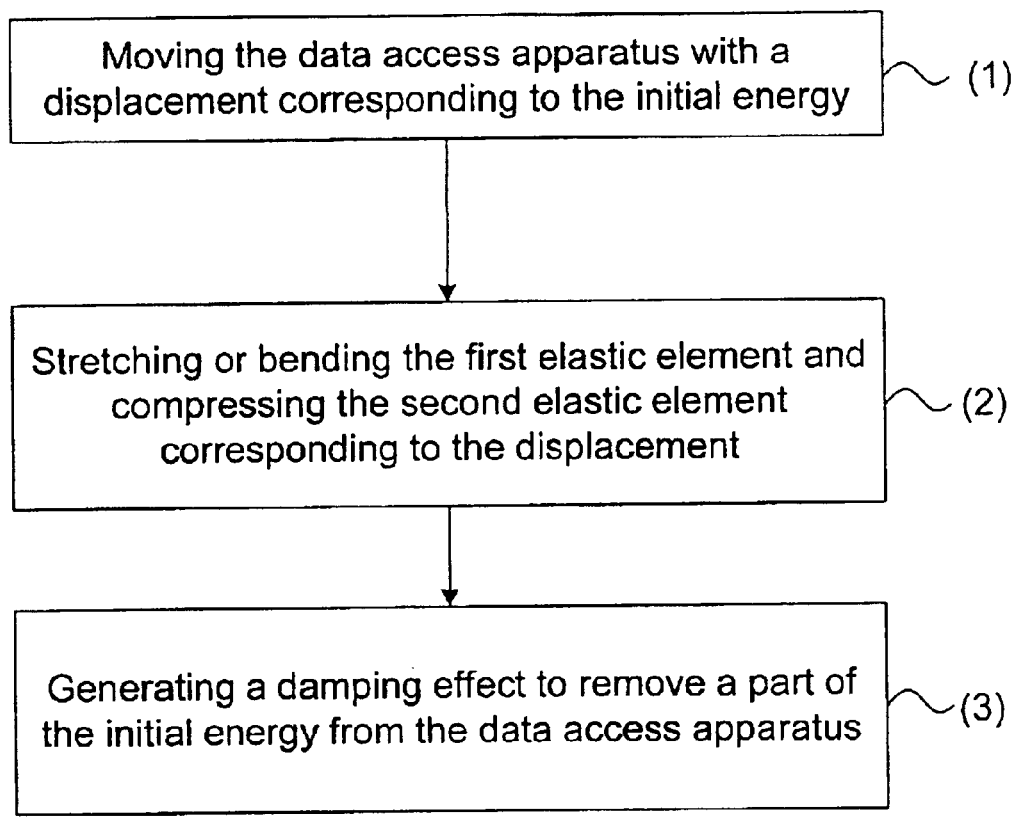
FIG. 6 shows a flow chart of an embodiment of the vibration-reducing method of the present invention.

As FIG. 6 shows, the first step, step (a), includes moving the data access apparatus 200 with a displacement corresponding to the initial energy. In this embodiment, the initial energy provides the data access apparatus 200 with a speed to generate the displacement.

In step (b), corresponding to the displacement, the data access apparatus 200 stretches or bends the first elastic element 300 and compresses the second elastic element 400. Under a unique-displacement condition, the rebound force provided by the first elastic element 300 is larger than that of the second elastic element 400, because the elastic module of the first elastic element 300 is larger than that of the second elastic element 400.

Then in step (c), a damping effect is generated on the ground of a difference between the elastic modulus of the first and the second elastic elements 300, 400 to remove a part of the initial energy from the data access apparatus 200.

Figure 7:
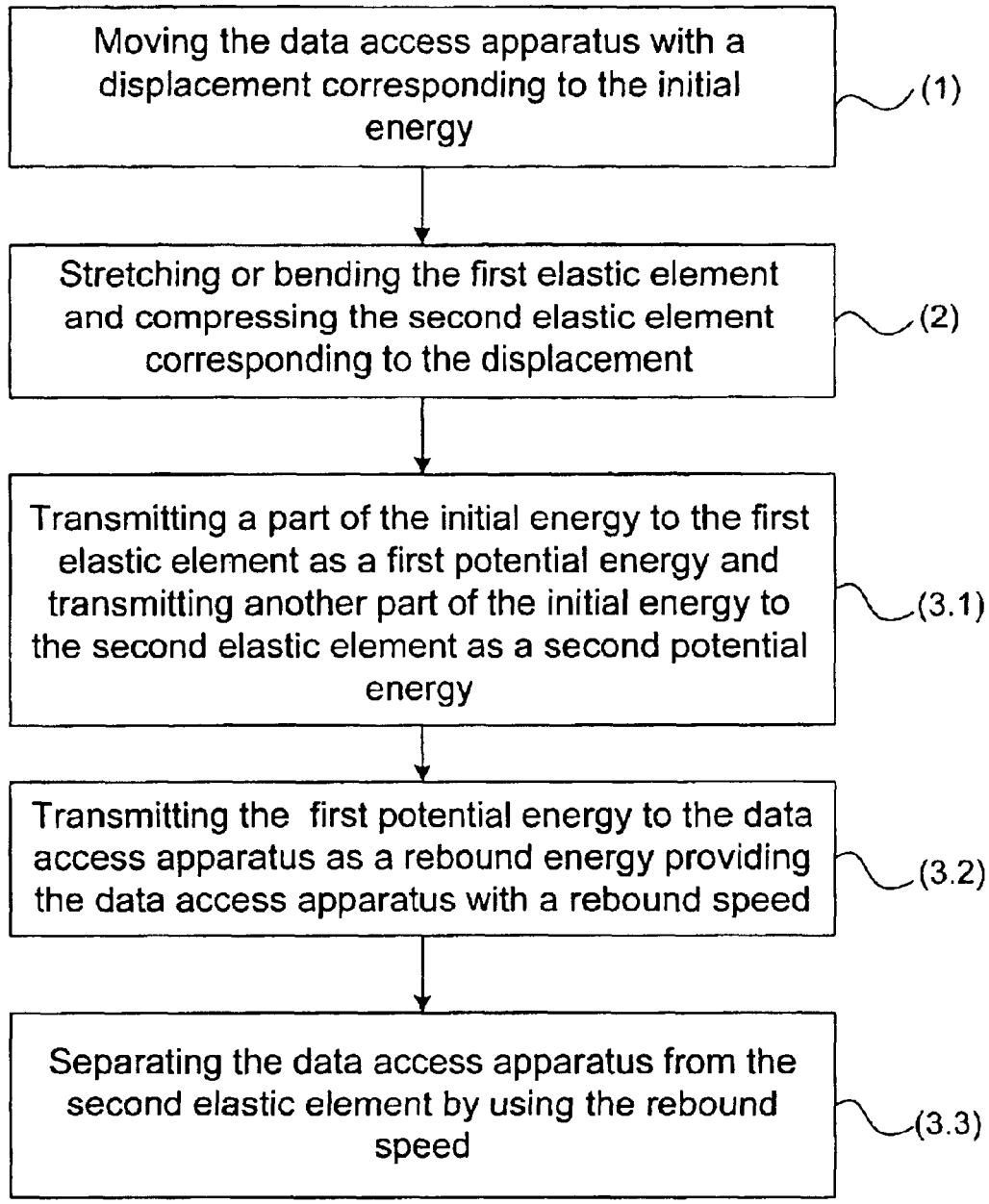
FIG. 7 shows a flow chart of another embodiment of the vibration-reducing method of the present invention.

In another embodiment shown as FIG. 7, step (c) further includes, first, transmitting a part of the initial energy to the first elastic element 300 as a first potential energy, and transmitting another part of the initial energy to the second elastic element 400 as a second potential energy. In this embodiment, under a unique-displacement condition, the first potential energy is larger than the second potential energy, because the elastic module of the first elastic element 300 is larger than that of the second elastic element 400.

Then the first potential energy is transmitted to the data access apparatus 200 as a rebound energy, which provides the data access apparatus 200 with a rebound speed. The rebound speed exceeds a returning speed of the second elastic element 400.

Then the rebound speed separates the data access apparatus 200 from the second elastic element 400 to prevent the second potential energy from transmitting back to the data access apparatus 200. Accordingly, a part of the initial energy is removed from the data access apparatus 200 to reduce the vibration of the data access apparatus 200.

Those skilled in the art will readily observe that numerous modifications and alterations of the device may be made within the teaching of the invention. Accordingly, the above disclosure should be construed as limited only by the metes and bounds of the appended claims.

What is claimed is:

1. A vibration-reducing system for use with a data processing apparatus, the data processing apparatus having a body and a data access apparatus coupled to the body, the body having a depression for containing the data access apparatus, the vibration-reducing system comprising:

at least one first elastic element having flexibility both in bending and in vertical extension, a first end of the first elastic element connecting with the data access apparatus, and a second end of the first elastic element connecting with the body, wherein the data access apparatus is suspended within the depression by using the first elastic element;

at least one second elastic element having flexibility in vertical compression, the second elastic element having an elastic modulus smaller than the elastic modulus of the first elastic element, the second elastic element being disposed between the body and the data access apparatus, the second elastic element including a first surface connecting with the body and a second surface opposite to the first surface and contacting with the data access apparatus;

wherein while the body is impacted to generate an initial energy and a displacement, the data access apparatus stretches or bends the first elastic element and compresses the second elastic element, then a damping effect generated by a difference between the elastic modulus of the first and the second elastic elements helps to remove a part of the initial energy from the data access apparatus.

2. The vibration-reducing system of claim 1, wherein the damping effect includes:

while the data access apparatus stretches or bends the first elastic element and compresses the second elastic element, a part of the initial energy is transmitted to the first elastic element as a first potential energy, and another part of the initial energy is transmitted to the second elastic element as a second potential energy;

the first potential energy provides the data access apparatus with a rebound speed, the rebound speed exceeds a returning speed of the second elastic element to separate the second surface from the data access apparatus and to prevent the second potential energy from transmitting back to the data access apparatus.

3. The vibration-reducing system of claim 1, wherein the body includes a frame contained within the depression and coupled to an inner surface of the depression, the data access apparatus connects with the frame by using the first elastic element, the second elastic element is disposed between the frame and the data access apparatus and the first surface connects to the frame.

4. The vibration-reducing system of claim 1, further comprising at least one vibration absorbing spacer disposed between the first elastic element and data access apparatus.

5. The vibration-reducing system of claim 1, wherein the body includes a cover corresponding to the depression for covering the data access apparatus, at least one second elastic element is disposed between the cover and the data access apparatus, the first surface of the second elastic element connects to an inner surface of the cover, and the second surface of the second elastic element contacts with the data access apparatus.

6. The vibration-reducing system of claim 1, wherein the first elastic element includes a spring.

7. The vibration-reducing system of claim 1, wherein the first elastic element includes an elastic rubber.

8. The vibration-reducing system of claim 1, wherein the second elastic element includes a vibration-absorptive material.

9. The vibration-reducing system of claim 1, wherein the data access apparatus includes a hard disk.

10. The vibration-reducing system of claim 1, wherein the data processing apparatus includes a portable computer.

11. The vibration-reducing system of claim 8, wherein the vibration-absorptive material includes a polymer.

12. A method for reducing vibration generated on a data access apparatus of a data processing apparatus by removing an initial energy of the data access apparatus, the method comprising:

(a) moving the data access apparatus with a displacement corresponding to the initial energy;

(b) stretching or bending a first elastic element and compressing a second elastic element by the data access apparatus corresponding to the displacement, wherein the elastic modulus of the second elastic element is smaller than the elastic modulus of the first elastic element;

(c) generating a damping effect by a difference between the elastic modulus of the first and the second elastic elements to remove a part of the initial energy from the data access apparatus.

13. The method of claim 12, wherein the step (C) further includes:

transmitting a part of the initial energy to the first elastic element as a first potential energy, and transmitting another part of the initial energy to the second elastic element as a second potential energy;

transmitting the first potential energy to the data access apparatus as a rebound energy and providing the data access apparatus with a rebound speed by the rebound energy, wherein the rebound speed exceeds a returning speed of the second elastic element; and separating the data access apparatus from the second elastic element by using the rebound speed to prevent the second potential energy from transmitting back to the data access apparatus.

14. The method of claim 12, wherein the first elastic element includes a spring.

15. The method of claim 12, wherein the first elastic element includes an elastic rubber.

16. The method of claim 12, wherein the second elastic element includes a vibration-absorptive material.

17. The method of claim 12, wherein the data access apparatus includes a hard disk.

18. The method of claim 12, wherein the data processing apparatus includes a portable computer.

19. The method of claim 16, wherein the vibration-absorptive material includes a polymer.

* * * * *